United States Patent [19]

Pape et al.

[11] Patent Number: 4,575,292

[45] Date of Patent: Mar. 11, 1986

[54] DEVICE FOR CONNECTING A TOOL PART TO A CONNECTING SHAFT

[75] Inventors: Dieter Pape, Rümlang; Hans Woerz, Oberhasli; Heinz Kaiser, Wallisellen, all of Switzerland

[73] Assignee: Heinz Kaiser A.G., Rümlang, Switzerland

[21] Appl. No.: 703,804

[22] Filed: Feb. 21, 1985

[30] Foreign Application Priority Data

Feb. 24, 1984 [CH] Switzerland ............................ 923/84

[51] Int. Cl.⁴ .......................... B23C 5/26; B23B 31/00
[52] U.S. Cl. ...................................... 409/234; 279/97; 408/239 R
[58] Field of Search ................... 409/234; 408/239 A, 408/239 R, 238, 146; 279/1 A, 97, 83; 403/378, 379, 355

[56] References Cited

U.S. PATENT DOCUMENTS

| | | | |
|---|---|---|---|
| 3,082,014 | 3/1963 | Wohlhaupter | 279/97 X |
| 3,999,769 | 12/1976 | Bayer et al. | 408/238 X |
| 4,063,843 | 12/1977 | Barkley et al. | 408/146 |
| 4,350,463 | 9/1982 | Friedline | 409/234 |

FOREIGN PATENT DOCUMENTS

| | | | |
|---|---|---|---|
| 3019970 | 12/1981 | Fed. Rep. of Germany | 409/234 |
| 85914 | 8/1957 | Netherlands | 279/97 |
| 537770 | 6/1973 | Switzerland | 409/234 |
| 924885 | 5/1963 | United Kingdom | 408/239 R |
| 2094191 | 9/1982 | United Kingdom | 409/234 |
| 537760 | 3/1977 | U.S.S.R. | 409/234 |

*Primary Examiner*—William R. Briggs
*Attorney, Agent, or Firm*—Weiser and Stapler

[57] ABSTRACT

A boring head is retained to a connecting shaft by means of a cylindrical fastening spigot, using a retaining screw with a conical end which engages a conical transverse bore in the spigot such that the boring head is tightened by wedging effect against the connecting shaft. The fastening spigot is provided with a cylindrical transverse bore, at an approximate right angle to the conical transverse bore in the spigot, and a longitudinally displaceable drive pin is supported in the cylindrical transverse bore such that the ends penetrate, with slight play, into recesses in the connecting shaft. During the transmission of torque, the drive pin is automatically centered so that the forces developed are evenly distributed between the two ends of the drive pin, so that the device is particularly suitable for the transmission of high torques, whether of a gradually increasing or an impulse type, and is usable either with a clockwise or a counterclockwise movement.

12 Claims, 16 Drawing Figures

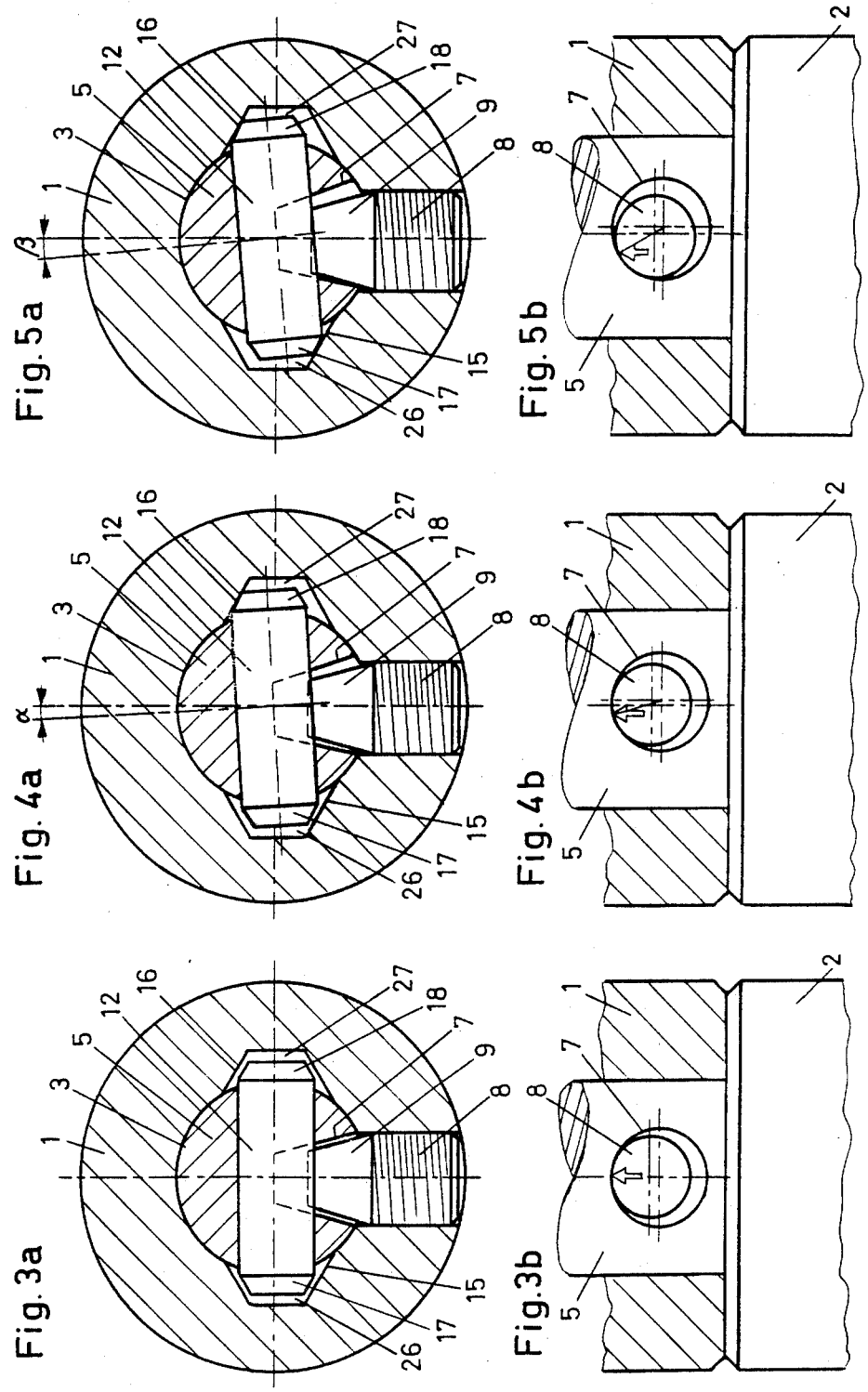

DEVICE FOR CONNECTING A TOOL PART TO A CONNECTING SHAFT

BACKGROUND OF THE INVENTION

The present invention generally concerns tool holding devices and the like, particularly those incorporating a centrally disposed bore for receiving a mating spigot of the tool part.

One device of this type is disclosed by Swiss Patent No. 537,770. Using this device, boring heads can be connected to an intermediate piece or shaft with high exchange accuracy and great stiffness. However, very high torques, such as occur when using particularly powerful machines, and such as are necessary for milling, boring and counter-boring tools, cannot be transmitted using this device.

The transmission of higher torques can be accomplished, in known fashion, using a variety of alternative means. For example, one alternative means which can be used is to double the transverse bore and retaining screw. This, however, apart from being awkward to deal with, also has the further disadvantage that exchange or repetition errors occur so that accurate positioning of the tool is not guaranteed. Another alternative which is available is the use of drive cams, however, this demands very high manufacturing accuracy and makes cleaning of the tool more difficult because of the existence of points which are difficult to access. Screw plug connections can also be used, but are not satisfactory because they can only rotate in one direction and are difficult to dismantle, and because they give an indeterminate position of the cutting edge. Axial clamping screws can be used, but have the disadvantage that the internal supply of coolant is only possible to a limited extent, and dealing with such devices is complicated.

SUMMARY OF THE INVENTION

The primary objective of the present invention is therefore to provide a device of the type previously mentioned which permits the transmission of high torques but which avoids the above-discussed disadvantages.

These and other objectives are achieved in a device of the tyoe previously mentioned which incorporates the features and characteristics recited in independent claim 1, with further advantages being recited by the dependent claims.

In particular, the device in accordance with the present invention possesses the advantage that the drive pin is automatically centered each time the tool is used, and the forces to be transmitted are therefore distributed evenly between the two ends of the drive pin. The resiliency of the drive pin, and particularly the structural configuration of the bearing surfaces needed for torque transmission, exert a vibration damping effect. The device in accordance with the present invention is subject to little soiling because it is substantially closed off to external conditions. A further advantage is that high production accuracy in the manufacture of such a device is not necessary.

An example of the present invention is described in more detail below, with reference to the following drawings.

BRIEF DESCRIPTION OF THE DRAWINGS

FIGS. 3a, 3b show a section along line II—II in FIG. 1, and an enlarged partial view of FIG. 1, respectively, with the boring head not being under load;

FIGS. 4a, 4b show views corresponding to FIGS. 3a and 3b, immediately after the boring head has been placed under load;

FIGS. 5a, 5b show views corresponding to FIGS. 3a and 3b, with the boring head under load;

DETAILED DESCRIPTION OF PREFERRED EMBODIMENTS

Figure 1:
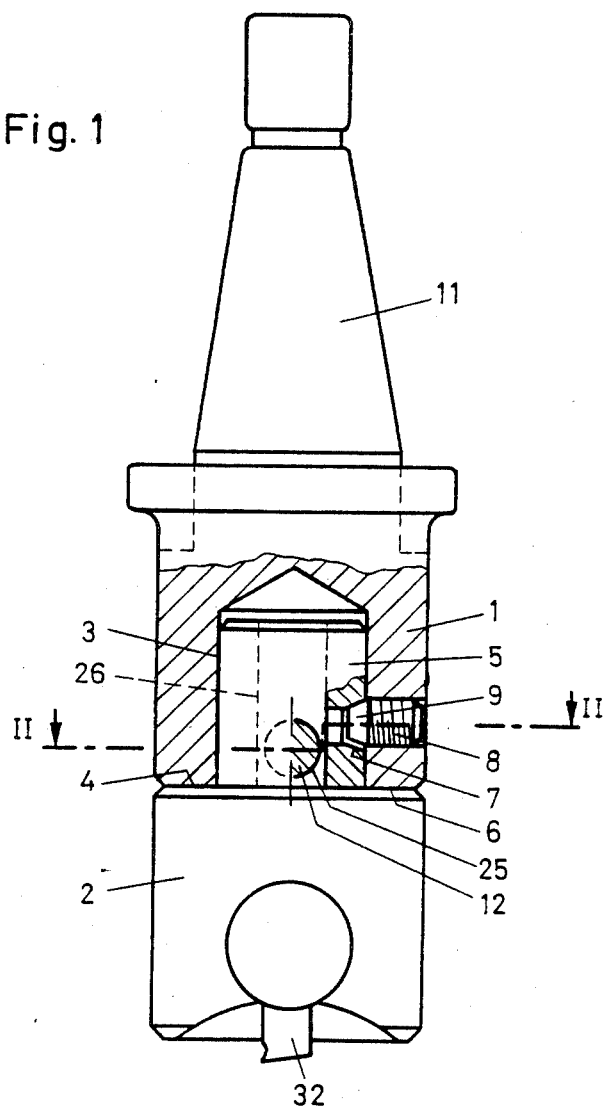
FIG. 1 shows an elevational view, partially in section, of a boring head inserted in a connecting shaft.
Figure 2:
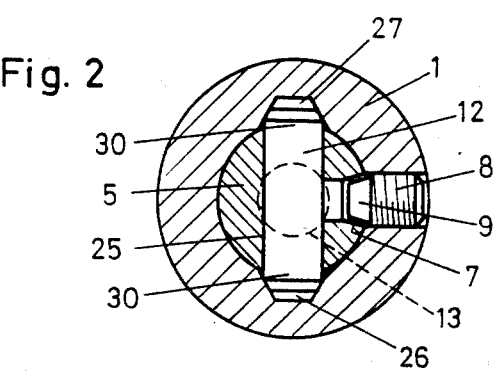
FIG. 2 shows a section along line II—II in FIG. 1.

FIGS. 1 and 2 show a boring head 2 provided with a cutter 32 and having a cylindrical fastening spigot 5. Fastening spigot 5 engages a corresponding bore 3 in connecting shaft 1. The connecting shaft 1 is capable of being clamped, by means of a fastening cone 11, in the chuck of a machine tool.

The fastening spigot 5 is provided with a conical bore 7. A retaining screw 8 having a conical turned end 9 is provided to engage the conical bore 7 such that when the retaining screw 8 is tightened, the shoulder 6 of the boring head 2 is caused to tighten against the corresponding end face 4 of the connecting shaft 1 as a result of wedging action developed between the conical bore 7 of the fastening spigot 5 and the conical turned end 9 of the retaining screw 8.

The fastening spigot 5 also has a cylindrical transverse bore 25 which runs approximately at a right angle to the conical bore 7, and within which a drive pin 12 is supported for longitudinal displacement. The two ends 30 of the drive pin 12 further penetrate into a pair of generally horizontally opposed recesses 26 and 27 in the connecting shaft 1, which recesses become narrower in a radially outward direction. The length of the drive pin 12 is such that the ends 30 of the drive pin 12 exhibit a slight play or clearance within the recesses 26 and 27. The recesses 26 and 27 have a shaped cross-section which may be, for example, trapezoidal or semi-circular. The ends 30 of the drive pin 12 are also shaped and may be, for example, wedge-shaped, conical-shaped, or rounded.

The manner of operation of such a device is described in more detail below, with reference to FIGS. 3a to 5b. In these illustrations, it is to be noted that the clearance between the drive pin 12 and the cylindrical transverse bore 25, as well as the recesses 26 and 27, has been exaggerated in order to clarify the following description.

Initially, the two tool parts 1 and 2 are assembled as previously described. As shown in FIG. 3b, when the boring head 2 is not under load, the retaining screw 8 presses against the top of the transverse bore 25, in a generally axial direction. As a result of the forces which are developed in the course of a cutting operation, the boring head 2 is caused to rotate by a small angle, relative to the connecting shaft 1 (see FIG. 4a), until one end 30 of the drive pin 12 is brought into contact with its respective recess 27 (or 26). As a result, the point at which the retaining screw 8 contacts the drive pin 12 is displaced transverse to the longitudinal axis of the tool (see arrow in FIG. 4b), with a simultaneous increase in contact pressure. With further increases in torque, the drive pin 12 is still further displaced along its longitudinal axis (see FIG. 5b), by the wedging effect developed at the recess which is contacted by the end of the drive pin 12, until both ends 30 of the drive pin 12 are in contact with the recesses 26 and 27 of the connecting shaft 1 (see FIG. 5a).

Thus, when the twisting between the two tool parts 1 and 2 attains its maximum angle, further twisting, and therefore, possible excess rotation of the connection, is prevented. Since the drive pin 12 is automatically centered in the loaded condition, the transmitted forces developed are always evenly distributed between the two ends 30.

Figure 6A:
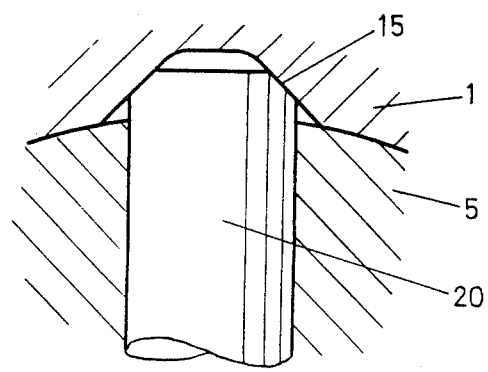
FIGS. 6a, 6b show a partial sectional view and a partial elevational view, respectively, of a first alternative embodiment drive pin in accordance with the present invention.
Figure 6B:
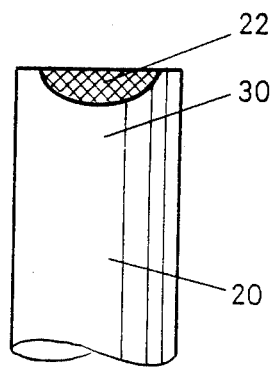
Figure 7A:
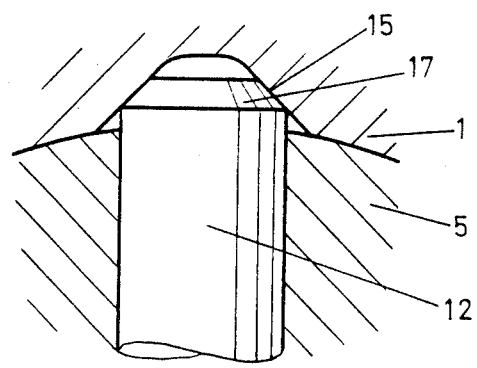
FIGS. 7a, 7b show a partial sectional view and a partial elevational view, respectively, of a second alternative embodiment drive pin in accordance with the present invention.
Figure 7B:
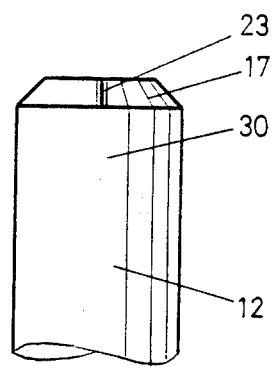
Figure 8A:
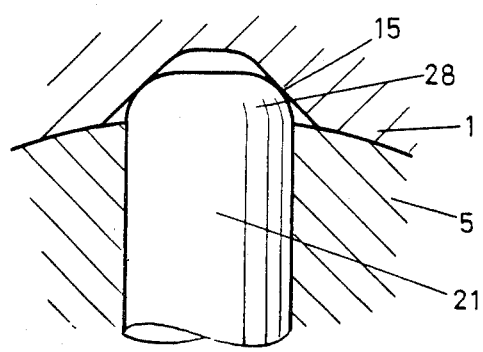
FIGS. 8a, 8b show a partial sectional view and a partial elevational view, respectively, of a third alternative embodiment drive pin in accordance with the present invention.
Figure 8B:
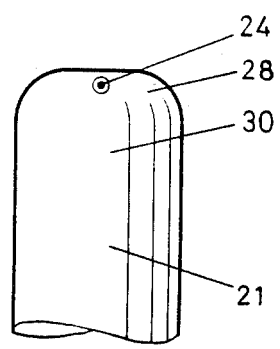

Three alternative embodiment drive pins are shown in FIGS. 6a to 8b. FIGS. 6a and 6b show a drive pin 20 with wedge-shaped ends 30 which, for example, can be brought into contact along the surfaces 22 with corresponding surfaces 15 of the recesses 26 and 27. FIGS. 7a and 7b show a drive pin 12 having conical ends 30 which, for example, can be brought into contact along the strips or regions 23 of the surfaces 17 with the surfaces 15 of the recesses 26 and 27. As illustrated in FIGS. 8a and 8b, the ends 21 can also be rounded or cap-shaped, so that they can, for example, be brought into contact along point or circular regions 24 of the surfaces 28 with the surfaces 15 of the recesses 26 and 27. The recesses 26 and 27 can, in addition to the trapezoidal cross-section shown, also have a semi-circular or arc-shaped cross-section.

Figure 9:
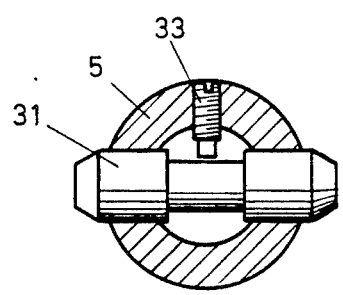
FIGS. 9, 10 show sectional views taken through a fastening spigot in the region of the drive pin.
Figure 10:
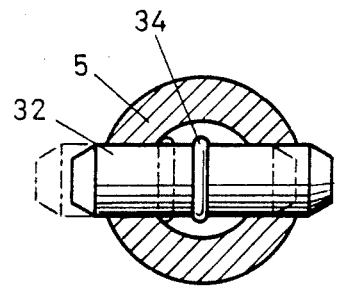

FIGS. 9 and 10 show drive pins which are designed so that the drive pin cannot laterally protrude from the assembly so as to prevent the tool parts 1 and 2 from being fitted together, and so that the drive pin cannot fall out, even when the tool parts are separated. The drive pin 31 shown in FIG. 9 is generally dumbbell-shaped. Its longitudinal displacement is capable of being limited by a pin 33 inserted in the fastening spigot 5. The drive pin 32 shown in FIG. 10 is encircled in the center by a spring ring 34 which limits displacement of the pin 32 in the longitudinal direction. The degree of displacement permitted by the pin 33 or the spring ring 34 can be selected so that the drive pin 12 can be retracted into the fastening spigot 5, one side at a time, so that it is possible to clean the connecting parts without difficulty.

Assembly of the two tool parts 1 and 2 is very simple because it is only necessary to fit the spigot 5 with the selected drive pin 12, 20 or 21, and to tighten the retaining screw 8. The tool parts 1 and 2 are easily separated, without jamming, by release of the retaining screw 8. It is also possible to fit together tool combinations incorporating several different tool parts, and the present invention therefore serves as the basis for a universal or modular tool system.

We claim:

1. A device for connecting tool parts of a tool system to a connecting shaft, said tool part having a cylindrical fastening spigot which is capable of being received in a bore of the connecting shaft, and a conical transverse bore within which a retaining screw is received to engage and wedge the tool part against the connecting shaft, and said device comprising:

a cylindrical transverse bore in said fastening spigot, positioned at an approximate right angle to the conical transverse bore, and a drive pin supported for longitudinal displacement within said cylindrical transverse bore and having ends which penetrate into recesses in the connecting shaft, which recesses become narrower in the radially outward direction.

2. The device of claim 1, wherein the ends of the drive pin are wedge-shaped.

3. The device of claim 1, wherein the ends of the drive pin are conical-shaped.

4. The device of claim 1, wherein the ends of the drive pin are rounded.

5. The device of claim 1, wherein the recesses are trapezoidal in cross-section.

6. The device of claim 1, wherein the recesses are semi-circular in cross-section.

7. The device of claim 1, wherein the drive pin is dumbbell-shaped and wherein a pin inserted in the fastening spigot limits lateral displacement of the drive pin.

8. The device of claim 1, wherein a spring ring encircles the drive pin so that the spring ring limits lateral displacement of the drive pin.

9. The device of claim 8, wherein the spring ring is centrally applied to the drive pin.

10. The device of claim 1, wherein the drive pin has a length which develops a slight play between the ends of the drive pin and the recesses in the connecting shaft.

11. The device of claim 10, wherein both ends of said pivot pin are capable of contacting the surfaces of said recesses, to evenly distribute developed forces between the two ends of the drive pin.

12. The device of claim 11, wherein said pivot pin is automatically centered within said tool part and said connecting shaft.

* * * * *